US012576524B2

(12) United States Patent
Mori et al.

(10) Patent No.: US 12,576,524 B2
(45) Date of Patent: Mar. 17, 2026

(54) CONTROL DEVICE, CONTROL METHOD, AND RECORDING MEDIUM

(71) Applicant: NEC Corporation, Tokyo (JP)

(72) Inventors: Youko Mori, Tokyo (JP); Tsutomu Maruyama, Tokyo (JP); Tadashi Natsukawa, Tokyo (JP); Masatsugu Ogawa, Tokyo (JP); Masumi Ichien, Tokyo (JP); Terumasa Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 18/484,974

(22) Filed: Oct. 11, 2023

(65) Prior Publication Data

US 2024/0139943 A1    May 2, 2024

(30) Foreign Application Priority Data

Oct. 27, 2022    (JP) ................................. 2022-172140

(51) Int. Cl.
B25J 9/16 (2006.01)
B25J 15/06 (2006.01)
(52) U.S. Cl.
CPC ......... B25J 9/1661 (2013.01); B25J 15/0616 (2013.01)

(58) Field of Classification Search
None
See application file for complete search history.

(56) References Cited

U.S. PATENT DOCUMENTS 9,604,358 B1 * 3/2017 Brazeau ................ B25J 9/0084
2022/0088778 A1 * 3/2022 Sun ........................ B25J 9/1697

FOREIGN PATENT DOCUMENTS

EP           4049806 A1 *  8/2022  ............ B25J 9/1687
JP     2020-046197 A      3/2020

OTHER PUBLICATIONS

English WIPO translation of EP-4049806-A1. (Year: 2022).*

* cited by examiner

*Primary Examiner* — Jason Holloway
*Assistant Examiner* — Christopher A Buksa
(74) *Attorney, Agent, or Firm* — Sughrue Mion, PLLC

(57) ABSTRACT

A control method includes: acquiring article information including a price of an article to be handled by a robot arm; deciding, based on the article information, a handling method of the article to be handled by the robot arm as a handling method in which as the price of the article is higher, damage prevention of the article is more prioritized; and controlling the robot arm that handles the article based on the handling method.

13 Claims, 12 Drawing Sheets

EMPTY CARDBOARD BOX (UPPER STAGE)
TRAY (LOWER STAGE)

(1) CARDBOARD BOX TO BE WORKED IS DETECTED

WORK DESK

CONVEYOR 2

ROBOT ARM R1

(2) ROBOT PERFORMS CONTAINER CONVERSION OF PRODUCT FROM CARDBOARD BOX TO TRAY (3) AFTER COMPLETION OF CONTAINER CONVERSION WORK, PRODUCT-LOADED TRAY IS FLOWN TO CONVEYOR

CONVEYOR 1

EMPTY TRAY (UPPER STAGE)
CARDBOARD BOX (LOWER STAGE)

Fig.5

| ARTICLE ID | ARTICLE NAME | SIZE | WEIGHT | PRICE |
|---|---|---|---|---|
| 123 | | | | 10000 |
| 456 | | | | 200 |
| 789 | | | | 3000 |

Fig.6

| PRICE | HANDLING METHOD |
|-------|-----------------|
| HIGH  | LOW SPEED       |
| LOW   | HIGH SPEED      |

Fig.7

| PRICE ZONE | PRICE RANGE | HANDLING METHOD |
|---|---|---|
| HIGH | 10000 OR MORE | LOW SPEED/SUCTION AND GRIPPING |
| MEDIUM | 3000 TO 9999 | HIGH SPEED/SUCTION AND GRIPPING |
| LOW | 2999 OR LESS | NORMAL (HIGH SPEED/SUCTION ONLY) |

Fig.8

| ARTICLE ID | ARTICLE NAME | SIZE | WEIGHT | HANDLING METHOD |
|---|---|---|---|---|
| 123 | | | | LOW SPEED/SUCTION AND GRIPPING |
| 456 | | | | HIGH SPEED/SUCTION ONLY |
| 789 | | | | HIGH SPEED/SUCTION AND GRIPPING |

Fig.11

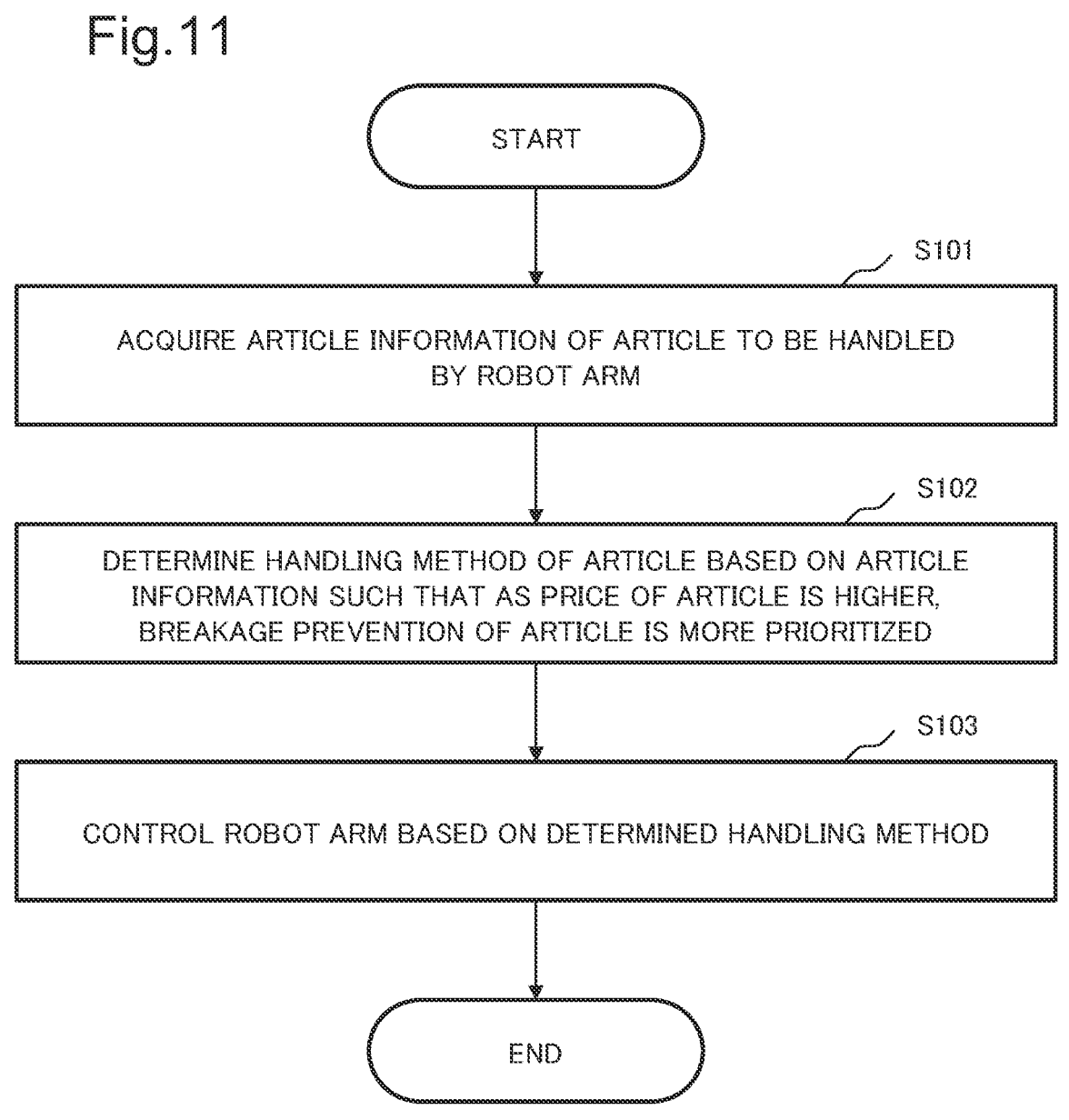

START

S101

ACQUIRE ARTICLE INFORMATION OF ARTICLE TO BE HANDLED
BY ROBOT ARM

S102

DETERMINE HANDLING METHOD OF ARTICLE BASED ON ARTICLE
INFORMATION SUCH THAT AS PRICE OF ARTICLE IS HIGHER,
BREAKAGE PREVENTION OF ARTICLE IS MORE PRIORITIZED

S103

CONTROL ROBOT ARM BASED ON DETERMINED HANDLING METHOD

END

CONTROL DEVICE, CONTROL METHOD, AND RECORDING MEDIUM

This application is based upon and claims the benefit of priority from Japanese Patent Application No. 2022-172140, filed on Oct. 27, 2022, the disclosure of which is incorporated herein in its entirety by reference.

TECHNICAL FIELD

The present disclosure relates to a technology for controlling robot arms, and the like.

BACKGROUND ART

Various types of robot arms are used in many applications. As an example, there are technologies for handling an article by a robot arm, such as moving or conveying the article.

For example, JP 2020-046197 A describes that control of a robot arm is changed depending on a material of an article.

SUMMARY

An object of the present disclosure is to provide a technology that makes it possible to appropriately handle various articles using a robot arm.

A control device according to one aspect of the present disclosure includes an acquisition means that acquires article information including a price of an article handled by a robot arm, a decision means that decides, based on the article information, a handling method of the article to be handled by the robot arm as a handling method in which as the price of the article is higher, damage prevention of the article is more prioritized, and a control means that controls the robot arm that handles the article based on the handling method.

In a control method according to an aspect of the present disclosure, a computer acquires article information including a price of an article to be handled by a robot arm, decides, based on the article information, a handling method of the article to be handled by the robot arm as a handling method in which as the price of the article is higher, damage prevention of the article is more prioritized, and controls the robot arm that handles the article based on the handling method.

A recording medium according to one aspect of the present disclosure records a program for causing a computer to execute acquiring article information including a price of an article handled by a robot arm, deciding, based on the article information, a handling method of the article to be handled by the robot arm as a handling method in which as the price of the article is higher, damage prevention of the article is more prioritized, and controlling the robot arm that handles the article based on the handling method.

BRIEF DESCRIPTION OF THE DRAWINGS

FIG. 5 is a diagram illustrating an example of article information;
FIG. 6 is a diagram illustrating an example of handling methods according to price;
FIG. 7 is a diagram illustrating an example of handling methods according to price;
FIG. 8 is a diagram illustrating an example of article information;
FIG. 11 is a flowchart of operations of the control device.

EXAMPLE EMBODIMENT

Next, an example embodiment of the present disclosure will be described in detail with reference to the drawings.

The present disclosure relates to control of a robot arm that handles an article. A control device according to the present disclosure controls a robot arm that handles an article. In the embodiment of the present disclosure, the article is not particularly limited as long as the article can be handled by the robot arm. The article is an article packaged in a predetermined unit for distribution, for example. As a more detailed example, the article is a chemical packaged in predetermined units. The robot arm that handles the article performs an operation of moving the article from one container to another container, for example. In the following description, this operation will be referred to as container conversion.

Figure 1:
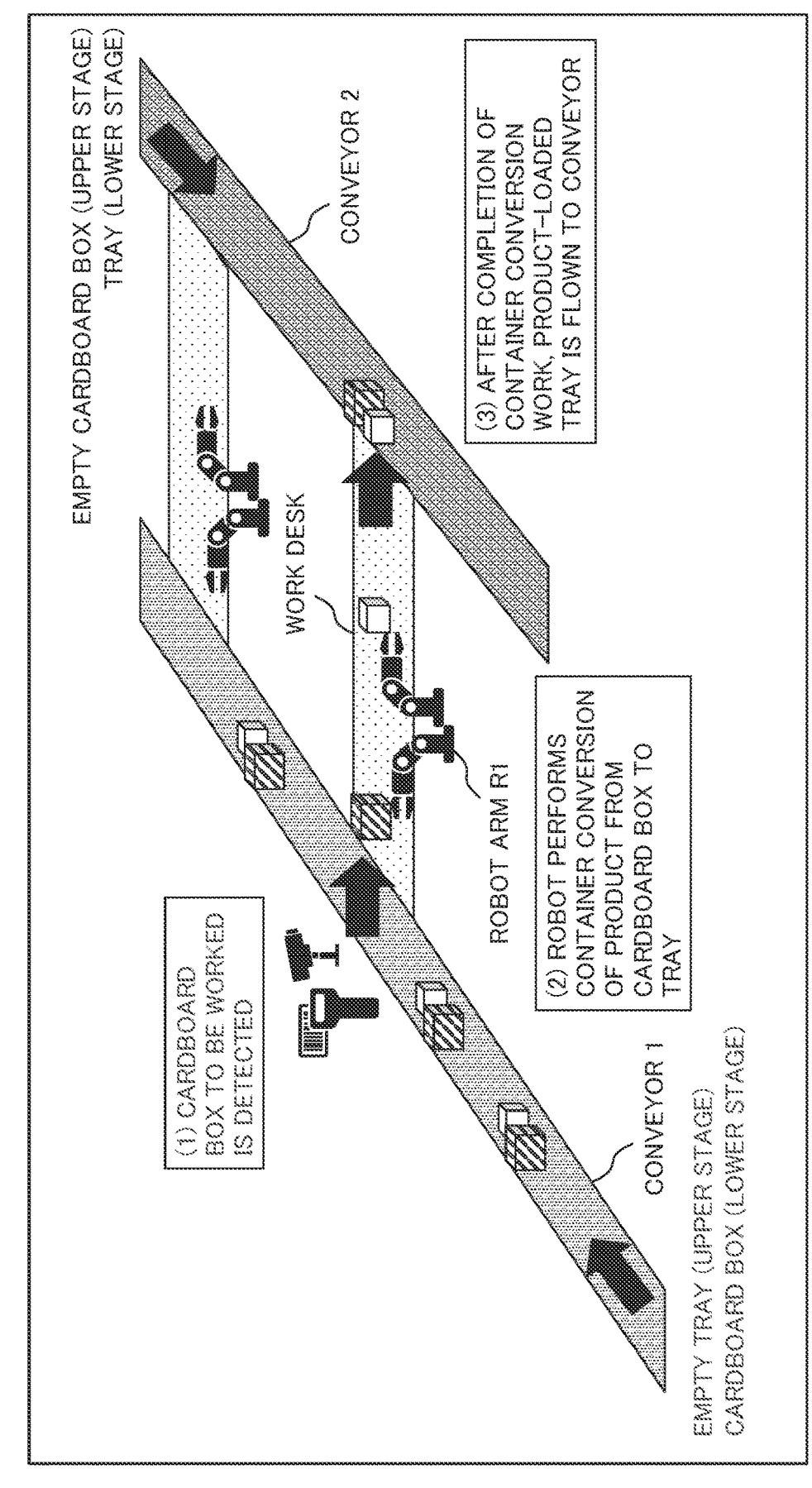
FIG. 1 is a diagram illustrating an example of work by a robot arm controlled by a control device.

An example of a series of work including the operation performed by the robot arm will be described with reference to FIG. 1. FIG. 1 is a schematic diagram illustrating an example of a series of works including the operation performed by the robot arm. Cardboard boxes filled with the article and empty trays on a conveyor 1 are moved to a work desk at which a robot arm R1 performs work. The article handled by the robot arm R1 is specified by image recognition using an image captured by a camera or a barcode reader. The robot arm R1 performs preset work on the specified article. Referring to FIG. 1, the robot arm R1 moves the article from the cardboard box to the tray. When the article is moved from the cardboard box to the tray, the cardboard box and the tray are flown to a conveyor 2. This series of work is repeated for various articles. The example of the work by the robot arm under the control of the control device according to the present disclosure is not limited to the example of container conversion of FIG. 1. The control device according to the present disclosure may be applied to control of the robot arm that performs work of moving an article, such as picking an article.

In relation to the embodiment, an example of performing work of handling various articles as in the example of FIG. 1 will be described in detail.

Figure 2:
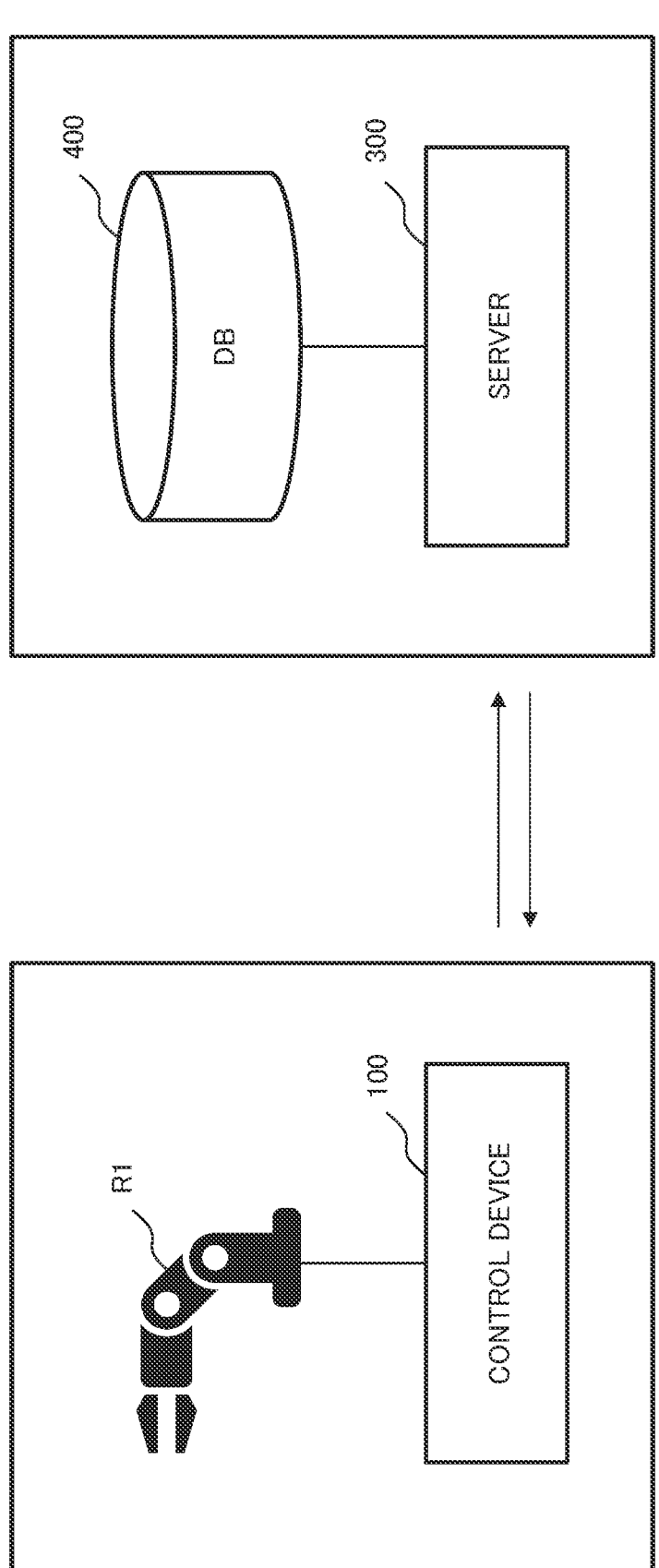
FIG. 2 is a diagram illustrating a configuration of a control system including a control device.

FIG. 2 is a diagram illustrating a configuration of a control system including the robot arm R1 and a server 300 used for controlling the robot arm R1.

Referring to FIG. 2, the robot arm R1 can perform work of handling an article as described above. The robot arm R1 performs an operation of lifting an article, an operation of moving the article, and an operation of releasing the article, for example. The type and specific structure of the robot arm R1 are not particularly limited as long as the robot arm R1 can perform these operations. For example, the robot arm R1 is a six-axis robot arm having a function of holding an article at the distal end. The function of holding an article may be achieved by a known method such as suction of an article or gripping of an article. The robot arm R1 may include both a suction hand and a gripping hand as a function of holding an article. In the robot arm R1, the suction hand and the gripping hand may be replaced as a function of holding an article. The robot arm R1 may be fixed to a stage, or may be provided in a self-propelled robot. The control device 100 may control one or more robot arms.

The server 300 reads information on the work to be performed by the robot arm R1 from a database 400 (hereinafter, also called DB), and transmits the information to the control device 100. The information on the work includes work instructions and article information of a work target article, for example. The article information is information indicating features of each article to be handled in work. The information on the articles are used in handling the articles. Details of the article information will be described later. The work instructions include information indicating work contents, information indicating the articles to be worked, and information indicating the number of articles to be worked. For example, the information indicating the work contents includes information indicating that the work is container conversion, information indicating a container of a movement source in the container conversion, and information indicating a container of a movement destination in the container conversion. The information indicating the container of the movement source and the information indicating the container of the movement destination may be information indicating the position of the container of the movement source and information indicating the position of the container of the movement destination, respectively. The information on the work target article is information indicating the work target article. For example, the information on the work target article is identification information for identifying the work target article.

The control device 100 controls the robot arm R1. As an example, the control device 100 is incorporated in the robot arm R1 described above, and controls the operations of the robot arm R1. The control device 100 is implemented by a computer described later, for example. The control device 100 also controls the operations of the robot arm using information on work of handling articles obtained from the server 300 and the database 400 and various kinds of sensor data obtained from various sensors not illustrated.

Next, a functional configuration of the control device 100 will be described with reference to FIG. 3.

Figure 3:
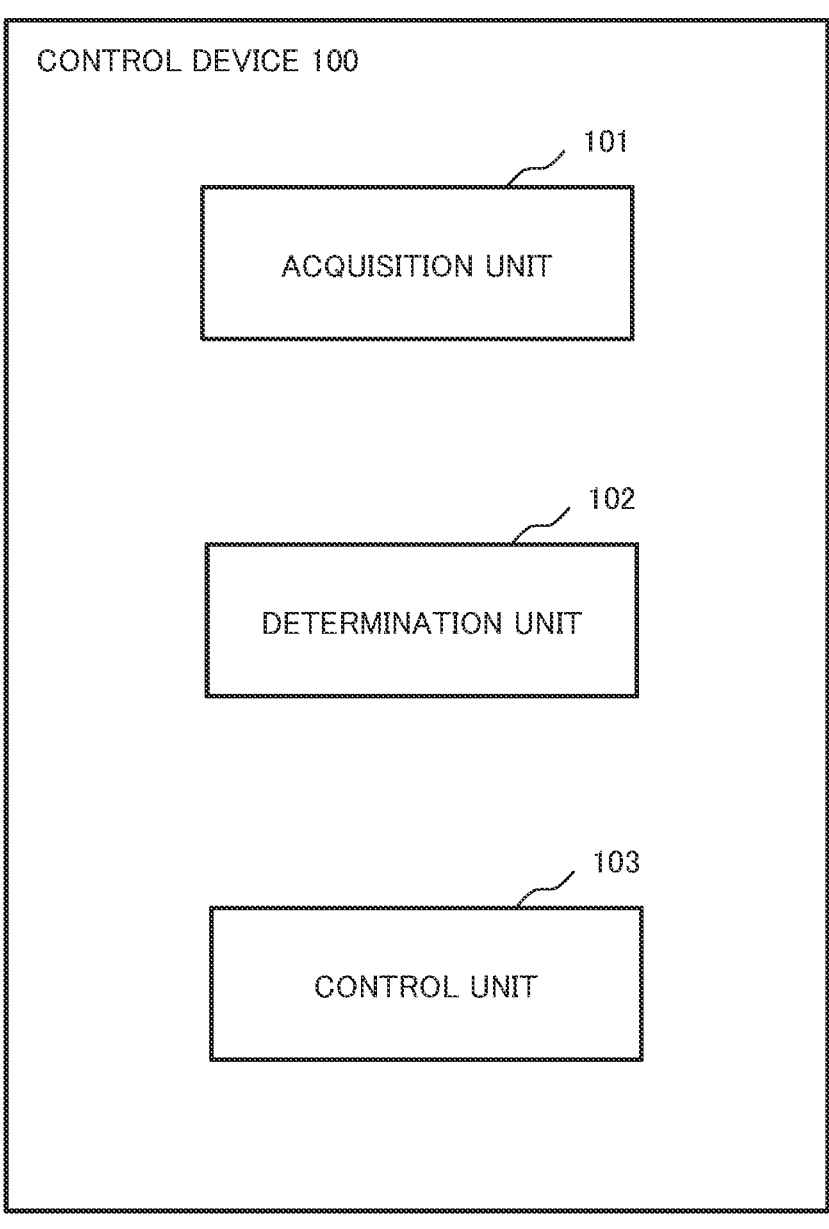
FIG. 3 is a block diagram illustrating a functional configuration of the control device.

FIG. 3 is a block diagram illustrating a functional configuration of the control device 100 according to the embodiment. Referring to FIG. 1, the control device 100 includes an acquisition unit 101, a decision unit 102, and a control unit 103. The acquisition unit 101 acquires article information of an article to be handled by the robot arm. The decision unit 102 decides the handling method of the article based on the article information. The control unit 103 controls the robot arm according to the decided handling method.

Figure 4:
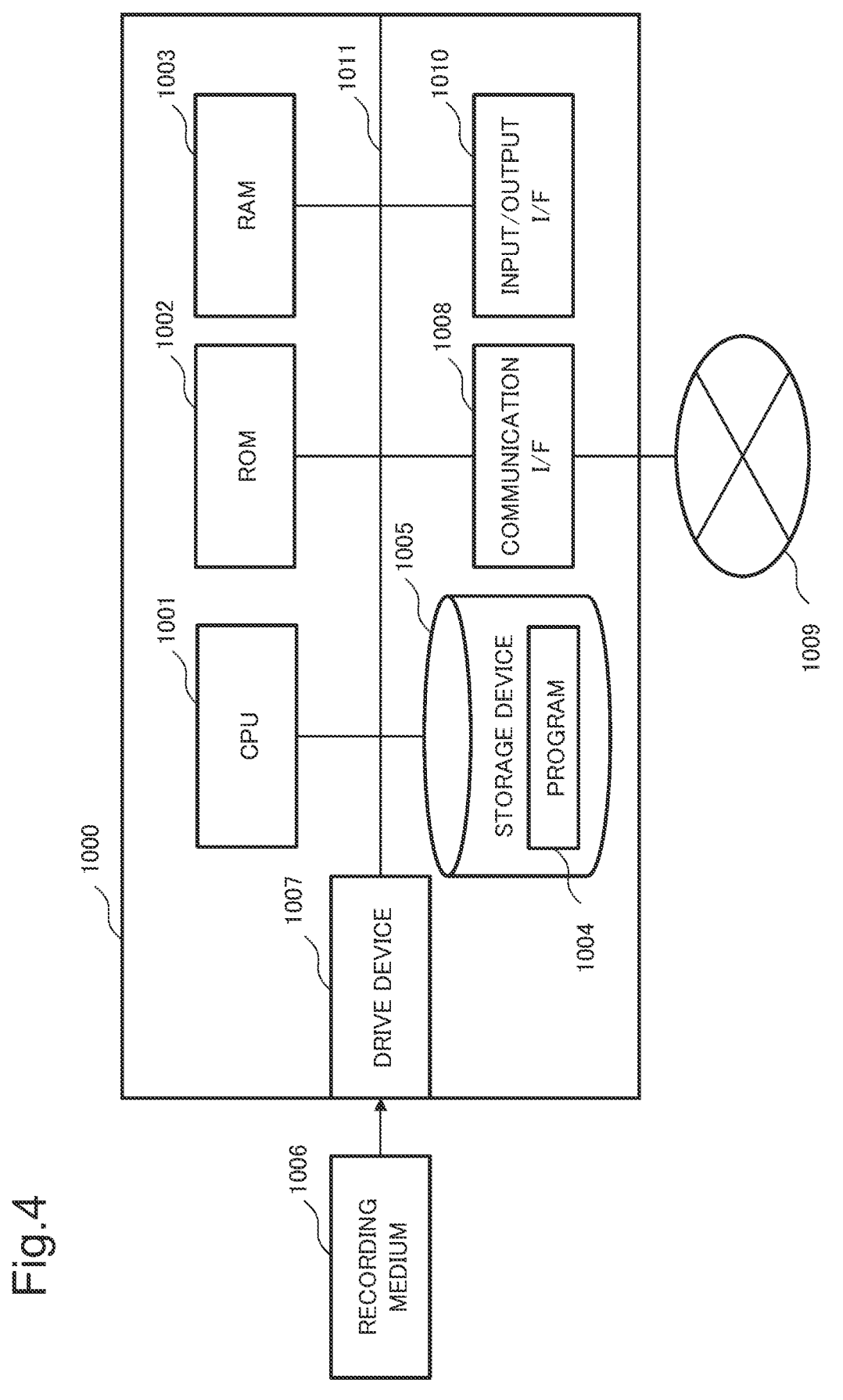
FIG. 4 is a diagram illustrating a hardware configuration in which the control device according to the present disclosure is implemented by a computer device and its peripheral devices.

Some or all of components of the control device 100 are implemented by an arbitrary combination of an information processing apparatus 1000 and a program as illustrated in FIG. 4, for example. The information processing apparatus 1000 includes the following components as an example:

Central processing unit (CPU) 1001
Read only memory (ROM) 1002
Random access memory (RAM) 1003
Program 1004 loaded into RAM 1003

Storage device 1005 that stores program 1004
Drive device 1007 that reads and writes recording medium 1006
Communication I/F 1008 connected to communication network 1009
Input/output I/F 1010 for inputting/outputting data
Bus 1011 connecting the components The I/F is an abbreviation of interface. The control device 100 is connected to the server 300 and the database 400 via the communication I/F 1008 and the communication network 1009. The above-described various sensors are connected to the control device 100 via the input/output I/F 1010. The sensors include a camera, a weight sensor, and a barcode reader, for example. The sensors may be communicatively connected to the control device 100 via the robot arm R1. The control device 100 controls the operations of the robot arm using the information on the work of handling an article obtained from the server 300 and the database 400 and various kinds of sensor data input via the input/output I/F 1010.

The components of each device or system in each embodiment is implemented by the CPU 1001 acquiring and executing a program for implementing these functions. The program for implementing the function of each component is stored in the storage device 1005 or the RAM 1003 in advance, for example, and the CPU 1001 reads the program as necessary. The program 1004 may be supplied to the CPU 1001 via a communication network, or may be stored in advance in the recording medium 1006, and the drive device 1007 may read the program and supply the same to the CPU 1001. The information processing apparatus 1000 has a wide variety of specific implementation examples that are not particularly limited.

Each functional configuration of the control device 100 will be described with reference to FIG. 3 again.

The acquisition unit 101 is an example of an acquisition unit that acquires article information including the price of an article to be handled by the robot arm. The acquisition unit 101 acquires article information from the database via a server communicably connected to the control device 100.

As described above, the article information is information indicating features of each article to be handled by the robot arm in work. The article information is used to control the robot arm that handles the article. Among the information included in the article information, the information used for controlling the robot arm that handles the article includes, but is not limited to, information indicating the price of the article, physical information regarding handling of the article, and the like. The article information may include identification information for identifying the article. As illustrated in FIG. 8 described later, the article information may include a handling method of the article as information used for control of the robot arm that handles the article.

The information indicating the price of the article is information regarding the price of the article. The information indicating the price of the article is at least one of the cost price, the purchase price, and the sales price of the article, for example.

The physical information regarding the handling of the article is the size of the article and the weight of the article, for example. The physical information regarding handling of the article may include at least one of the material of the article, the fragility of the article, whether the article is a dangerous article, and the flammability of the article.

The information for identifying the article may be information for specifying the article from article identifier (ID), an article name, character string included in a barcode or a two-dimensional code, a name, and an image.

FIG. 5 is a diagram illustrating an example of article information. In FIG. 5, the article information includes an article ID, an article name, an article size, an article weight, and an article price. In FIG. 5, the article ID and the article name are information for identifying the article. The size of the article, the weight of the article, and the price of the article are information used for controlling the robot arm that handles the article. The article information is not limited to these examples.

An example of a specific method for the acquisition unit 101 to acquire article information will be described. The acquisition unit 101 first specifies an article to be handled by the robot arm. As a method for specifying the article, a known method may be used. For example, the acquisition unit 101 specifies an article to be handled by the robot arm by recognition of an image reflecting the article or by collating a result of reading of a barcode or a two-dimensional code assigned to the article with identification information of the article included in the article information. The article may be specified from the container in which the article is placed. The article may be specified by a server. Next, the acquisition unit 101 acquires article information associated with the specified article from the server. Alternatively, the acquisition unit 101 may acquire the article information from the article information of a work target included in a work instruction transmitted in advance from the server.

The decision unit 102 is an example of a decision unit that decides a method of handling an article by the robot arm based on the article information. The decision unit 102 decides the handling method of the article handling method of the article to be handled as the price of the article is higher, the damage prevention of the article is more prioritized. The decision unit 102 may determine a handling method such that as the price of the article is lower, the efficiency of the entire work is more prioritized than the damage prevention of the article. The decision unit 102 may decide, at a plurality of stages, a handling method according to the price such that as the price of the article is higher, the damage prevention of the article is more prioritized. Alternatively, the decision unit 102 may continuously determine a handling method according to the price such that as the price of the article is higher, the damage prevention of the article is more prioritized. The handling method in which the efficiency of the entire work is prioritized is a handling method including at least one of a handling method in which the speed of the entire work is faster and a handling method in which the power consumption of the work is lower, for example. The handling method in which the breakage prevention of the article will be described later.

For example, the decision unit 102 determines whether the price is higher than a reference value, and if determining that the price of the article is higher than the reference value, the decision unit 102 decides the handling method of the article in which the breakage prevention of the article is more prioritized. For example, the decision unit 102 compares the price of the article included in the article information with a preset reference value to determine whether the price of the article is higher than the reference value. Alternatively, for example, the decision unit 102 may determine whether the price of the article is higher than the reference value based on the presence or absence of a flag included in the article information indicating that the price of the article is higher than the reference value. Herein, the flag indicating that the price of the article is higher than the reference value may be set in advance in comparison with the reference value. The decision unit 102 decides a handling method of the article based on the result of the determination as to whether the price of the article is higher. Based on the result of determination as to whether the price of the article is higher, the decision unit 102 refers to information in which the result of the determination as to whether the price of the article is higher and the handling method according to the result of the determination are associated with each other to decide the handling method of the article. The information in which the result of the determination as to whether the price of the article is higher and the handling method according to the result of the determination are associated with each other, is associated in advance with a handling method in which the breakage prevention of the article is more prioritized, in response to the result of the determination as to whether the price of the article is higher. In addition, the information in which the result of the determination as to whether the price of the article is higher and the handling method according to the result of the determination are associated with each other, is associated in advance with a handling method in which the efficiency of the entire work is more prioritized, in response to the result of the determination as to whether the price of the article is lower. For example, if determining that the price of the article is higher, the decision unit 102 decides the handling method of the article as a handling method in which the breakage prevention of the article is more prioritized. For example, the decision unit 102 refers to information in which the result of the determination as to whether the price is higher and the handling method according to the result of the determination are associated with each other, and if determining that the price of the article is higher, the decision unit 102 decides the handling method of the article as a handling method in which the breakage prevention of the article is more prioritized.

FIG. 6 is an example of information in which the result of the determination as to whether the price is higher and the handling method according to the result of the determination are associated with each other. It is assumed that handling the article at a lower speed by the robot arm reduces the possibility of damaging the article even in the event of any problem as compared with the case of handling the article by the robot arm at a higher speed.

FIG. 6 indicates that, if it is determined that the price of the article is higher, the handling method is set as a handling method in which the robot arm performs the operation of handling the article at a low speed. The handling method in which the robot arm handles the article at a low speed is an example of a handling method in which the breakage prevention of the article is more prioritized. FIG. 6 also indicates that, if it is determined that the price of the article is lower, the handling method is set as a handling method in which the robot arm performs the operation of handling the article at a high speed. The method in which the robot arm performs the operation of handling the article at a high speed is an example of a handling method in which the efficiency of the entire work is more prioritized.

For example, if determining that the price of the article is higher, the decision unit 102 refers to the information illustrated in FIG. 6 to decide the handling method of the article as a handling method in which the robot arm performs the operation of handling the article at a low speed. In FIG. 6, specific numerical values of the operation speed may be set instead of "low speed" or "high speed". The handling method according to the result of the determination on the price is not limited to the example in FIG. 6.

For example, the decision unit 102 may determine the highness of price of the article and decide the handling method of the article according to the highness of price of the article. The decision unit 102 determines the level of the price of the article included in the article information using the price range set in advance. Then, the decision unit 102 refers to the information indicating the handling method according to the level of price of the article, determines the handling method of the article as a handling method in which as the level of the price of the article is higher, the damage prevention of the article is more prioritized. That is, a plurality of methods of handling the article according to the price of the article may be set stepwise, not only two types of handling methods, that is, the handling method in which the efficiency of the entire work is more prioritized and the handling method in which the damage prevention of the article is more prioritized.

FIG. 7 is another example of information in which the level of price of the article and the handling method according to the price range of the article are associated with each other. As described above, it is assumed that handling the article at a lower speed by the robot arm reduces the possibility of damaging the article even in the event of any problem as compared with the case of handling the article by the robot arm at a higher speed. Furthermore, it is assumed that holding the article by the robot arm through suction and gripping reduces the possibility of damaging the article even in the event of any problem as compared with the case of holding the article by the robot arm only through suction.

FIG. 7 indicates that, if it is determined that the price of the article belongs to the high price range, the handling method is set as a handling method in which the robot arm handles the article at a low speed, and the robot arm holds the article through suction and gripping of the article. The handling method in which the robot arm handles the article at a low speed and the handling method in which the robot arm holds the article through suction and gripping of the article are examples of handling methods in which the damage prevention of the article is more prioritized. The handling method in which the robot arm holds the article through suction and gripping of the article is a handling method in which the damage prevention of the article is more prioritized as compared with a handling method in which the robot arm holds the article only through suction of the article, which will be described later. If it is determined that the price of the article belongs to the medium price range, the handling method is a handling method in which the robot arm handles the article at a high speed, and the robot arm holds the article through suction and gripping of the article. A handling method in which a handling method in which the robot arm handles the article at a high speed, which is an example of a handling method in which the efficiency of the entire work is prioritized, and a handling method in which the robot arm holds the article through suction and gripping, which is an example of a handling method in which the damage prevention of the article is more prioritized are combined, is an example of a handling method in a case where the price of the article belongs to the medium price range. In addition, if it is determined that the price of the article belongs to the low price range, the handling method is a handling method in which the robot arm handles the article at a low speed, and the robot arm holds the article only through suction of the article. The handling method in which the robot arm handles the article at a high speed and the handling method in which the robot arm holds the article only through suction are examples of the handling method in which the efficiency of the entire work is prioritized.

For example, if the price of the article is 10,000 yen, the decision unit 102 determines that the price of the article belongs to the high price range, and refers to the information illustrated in FIG. 7 to decide the handling method of the article as a handling method in which the robot arm handles the article at a low speed and the robot arm holds the article through suction and gripping of the article. The number of the price ranges, the price ranges, and the handling methods are not limited to the example in FIG. 7.

The decision unit 102 may decide the handling method of the article by the robot arm with reference to the handling method included in the article information. In this case, the article information includes the handling method according to the price of the article, in which as the price of the article is higher, breakage prevention of the article is more prioritized. In this case, the handling method of each article included in the article information is set based on the price of each article. In other words, the handling method of each article included in the article information reflects the price of each article. That is, the fact that the handling method of each article in the article information is decided according to the price is an example of the fact that the article information includes the price of the article. In this case, the article information may not include information explicitly indicating the price itself.

FIG. 8 is an example of article information including a handling method according to the price of an article. The article information does not include the price of the article but includes the article handling method, unlike the example of the article information in FIG. 5. As the article handling method, as described above, a handling method in which as the price of the article is higher, the breakage prevention of the article is more prioritized may be set in advance.

In FIG. 8, the prices of the articles are higher in the order of an article with an article ID of 123, an article with an article ID of 789, and an article with an article ID of 456. In FIG. 8, the handling methods corresponding to the prices are set to these articles. As described above, the handling method according to the price is a handling method in which as the price of the article is higher, the breakage prevention of the article is more prioritized.

For example, in FIG. 8, it is assumed that the article with the article ID of 123 is an article in a high price level. Therefore, for the article with the article ID of 123, the handling method in which the breakage prevention of the article is more prioritized is set, which is a handling method in a case where the price of the article is high. In FIG. 8, specifically, the handling method in which the article is handled at a low speed and the handling method in which the article is held through suction and gripping are set. In FIG. 8, it is assumed that the article with the article ID of 456 is an article in a low price level. Therefore, for the article with the article ID of 456, the handling method in which the efficiency of the entire work is prioritized is set, which is a handling method in a case where the price of the article is low. In FIG. 8, specifically, the handling method in which the article is handled at a high speed and the handling method in which the article is held only through suction are set. In FIG. 8, it is assumed that the article with the article ID of 789 is an article in a medium price level. Therefore, for the article with the article ID of 789, the handling method in which the efficiency of the entire work is prioritized, which is a handling method in a case where the price of the article is low, and the handling method in which the breakage prevention of the article is prioritized, which is a handling method in a case where the price of the article is high, are combined.

As the handling method of the article, a handling method based on other features of the article other than the price of the article may be set in advance. Other features of the article include the size of the article, the weight of the article, the material of the article, the fragility of the article, whether the article is a dangerous article, and the flammability of the article, for example. In this case, the decision unit 102 may decide a handling method based on another feature of the article as the handling method of the article. For example, the decision unit 102 may also decide, as the handling method of the article, the handling method in which the damage prevention of the article is more prioritized between the handling method according to the price of the article and the handling method based on another feature of the article. For example, if the article is a dangerous article, if the article is fragile, or if the flammability of the article is high, it is assumed that the handling method in which the damage prevention of the article is more prioritized is set in advance. In this case, even if the price of the article is a price associated with the handling method in which the efficiency of the entire work is more prioritized, the decision unit 102 may specify the article and determine the handling method of the article with reference to the article information including the handling method of the specified article as illustrated in FIG. 8.

Next, the handling method in which the breakage prevention of the article is more prioritized will be described. As described above, the handling method in which the breakage prevention of the article is more prioritized is a handling method in which the breakage prevention of the article is more prioritized than the efficiency of the entire work. The handling method in which the breakage prevention of the article is more prioritized is a method in which a human carefully handles an object. An example of the handling method in which the breakage prevention of the article is more prioritized will be described.

For example, a handling method in which the breakage prevention of the article is more prioritized is a handling method in which the speed of the robot arm is changed. The handling method in which the breakage prevention of the article is more prioritized relating to the operation speed of the robot arm is a handling method in which the operation of handling the article is slowed down, for example. For example, the decision unit 102 decides the handling method related to the operation speed of the robot arm as a handling method in which as the price of the article is higher, the operation speed of the robot arm is decreased. On the other hand, the decision unit 102 decides the handling method related to the operation speed of the robot arm as a handling method in which as the price of the article is lower, the operation speed of the robot arm is increased. The speed of the robot arm is the speed at which each axis of the robot arm moves while the robot arm handles the article, for example. Alternatively, the speed of the robot arm may be the moving speed of the gripping hand while the robot arm lifts the article by gripping. As described above, accelerating the operation as the price of the article is lower and decelerating the operation as the price of the article is higher makes it possible to speed up the entire work as compared with the case of handling all the articles at a low speed, while preventing breakage of the article that is determined to have a higher price.

The decision unit 102 may decide the operation speed of the robot arm according to the price within a predetermined range of speed. The decision unit 102 may also decide the handling method related to the operation speed of the robot arm as a handling method in which as the price of the article is higher, the operation speed of the robot arm is decreased, by using the information indicating the handling method according to the result of determination of the price as illustrated in FIG. 6.

Another example of the handling method in which the breakage prevention of the article is more prioritized related to the operation speed of the robot arm is a handling method in which at least one of acceleration and deceleration is decreased during operation. In other words, decreasing the acceleration and deceleration during operation means not allowing sudden acceleration and sudden deceleration during operation. The sudden deceleration includes a sudden stop. For example, the decision unit 102 decides the handling method related to the operation speed of the robot arm as a handling method in which as the price of the article is higher, at least one of acceleration and deceleration of the operation of the robot arm is decreased. On the other hand, the decision unit 102 may decide the handling method related to the speed of the operation of the robot arm as a handling method in which if the price of the article is low, at least one of acceleration and deceleration of the operation of the robot arm is not limited. As described above, if the price of the article is high, sudden acceleration and sudden stop during operation are not permitted, so that it is possible to speed up the entire work as compared with a case where all the articles are handled without permitting sudden acceleration and sudden stop while preventing breakage of the high-priced articles.

In addition, the handling method in which the damage prevention of the article is more prioritized is a handling method related to an operation of lifting the article by the robot arm, for example. The handling method in which the breakage prevention of the article is more prioritized related to the operation of lifting the article by the robot arm, is a handling method in which the possibility of fall of the article is reduced. The operation of lifting the article by the robot arm includes sucking the article or gripping the article, for example.

The handling method in which the breakage prevention of the article is more prioritized related to the operation of lifting the article by the robot arm is to increase at least one of the number of arms used in the operation of lifting the article and the number of parts that support the article in the operation of lifting the article, for example. For example, if the price of the article is lower than the reference value, the decision unit 102 decides the handling method in which the article is lifted through suction by the robot arm, and if the price of the article is higher than the reference value, the decision unit 102 determines the handling method in which the article is lifted through suction and gripping by the robot arm. As described above, if the price of the article is low, the lifting operation is performed only by suction, and if the price of the article is high, the lifting operation is performed by suction and gripping, whereby the high-priced article can be more reliably lifted, and the low-priced article can be lifted in a shorter time by eliminating the time required for gripping. The method is an example in which if the efficiency of the entire work is prioritized, the article is lifted only by suction, and if the breakage prevention of the article is prioritized, the article is lifted by suction and gripping. As a method in which the efficiency of the entire work is prioritized and a method in which the breakage prevention of the article is prioritized, only suction, only gripping, and suction and gripping may be set in advance depending on the robot arm to be used.

In addition, the handling method in which the damage prevention of the article is more prioritized is a handling method related to the number of robot arms handling the article, for example.

The handling method in which the damage prevention of the article is more prioritized related to the number of robot arms that handle the article, is to increase the number of robot arms that handle the article, for example. For example, the decision unit 102 decides the handling method related to the operation of lifting the article by the robot arm as a handling method in which as the price of the article is higher, the number of robot arm lifting the article is increased. For example, if the price of the article is lower than the reference value, the decision unit 102 determines that the article is to be handled by one robot arm as the article handling method, and if the price of the article is higher than the reference value, the decision unit 102 determines that the article is to be handled by two robot arms as the article handling method.

Figure 9:
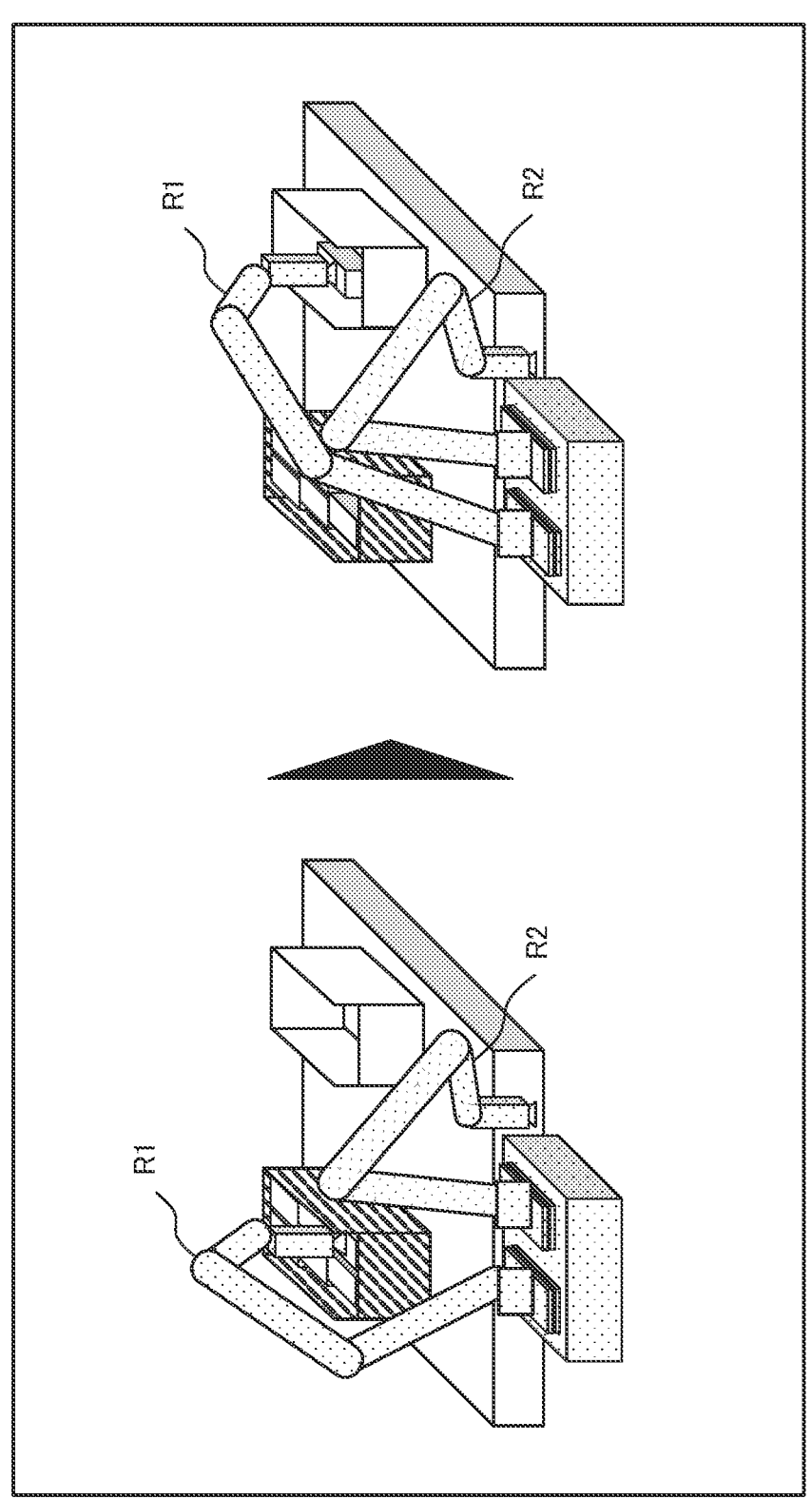
FIG. 9 is a diagram illustrating an example of an operation by one robot arm.
Figure 10:
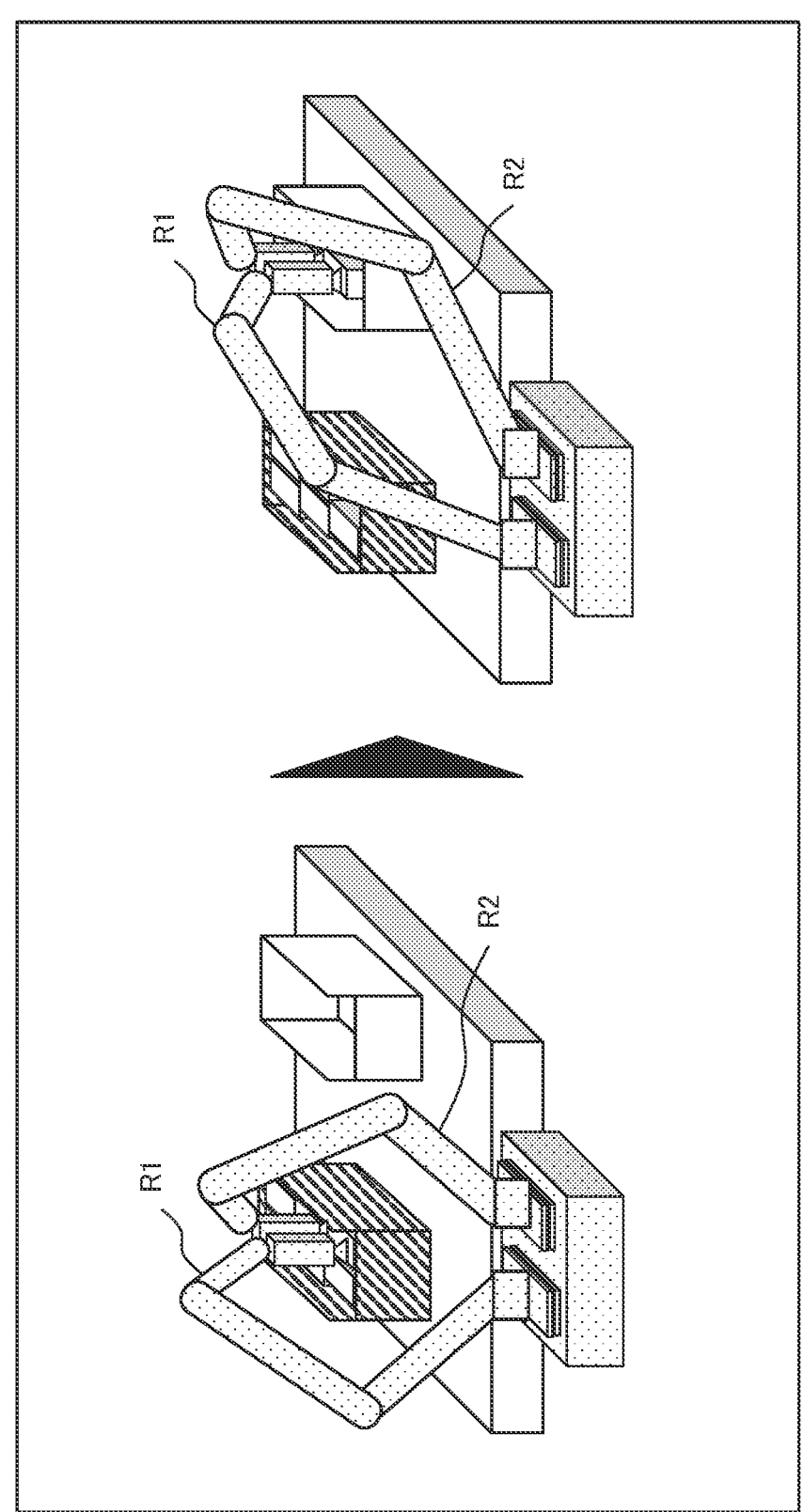
FIG. 10 is a diagram showing an example of an operation by two robot arms.

FIGS. 9 and 10 are diagrams illustrating examples in which container conversion of the article is performed by one or two robot arms. In FIG. 9, the robot arm R1 sucks and moves one article and places the article in an adjacent box. In FIG. 9, the robot arm R2 does not operate. As illustrated in FIG. 9, if the article is handled only by the robot arm R1, the robot arm R2 may handle an article different from the article handled by the robot arm R1. On the other hand, in FIG. 10, the robot arm R1 and the robot arm R2 suck and move one article and place the article in the adjacent box. The number of robot arms that handle the article is not limited to these examples.

As described above, if the price of the article is low, the article is handled by one robot arm, and if the price of the article is high, the article is handled by two robot arms. Accordingly, for example, if the price of the article is high, the article is lifted so as not to drop the article to prevent the breakage of the article, and if the price of the article is low, two articles are handled at a time to quickly perform work. That is, it is possible to improve the time efficiency of the entire work while preventing the breakage of the high-priced article. Alternatively, if the price of the article is low, the article is handled by one robot arm, and if the price of the article is high, the article is handled by two robot arms. Accordingly, for example, if the high-priced article is handled, the article is lifted so as not to drop the article to prevent the breakage of the article, the power consumption for moving the robot arm can be reduced. That is, it is possible to improve the efficiency of the power consumption of the entire work while preventing the breakage of the high-priced article.

In addition, the handling method in which the breakage prevention of the article is more prioritized is a handling method related to an operation of placing the article by the robot arm, for example. The handling method in which the breakage prevention of the article is more prioritized related to the operation of placing the article by the robot arm is a handling method in which an impact applied to the article being placed is reduced. The handling method in which the impact applied to the article being placed is reduced is a handling method in which the height at which the article is released during the operation of placing the article is decreased, for example. More specifically, the height at which the article is released is a distance from the article placement surface to the article during the operation of releasing the article. For example, the decision unit 102 decides the handling method related to the operation of releasing the article by the robot arm as a handling method in which as the price of the article is higher, the distance from the article placement surface to the article during the operation of releasing the article is shortened. For example, if the price of the article is high, the decision unit 102 decides the handling method of the article as a handling method in which the article is released at a height at which the distance from the article placement surface to the article becomes 0 after the article touches the placement surface, that is, at the time of the operation of releasing the article. Conversely, if the price of the article is low, the decision unit 102 may decide the handling method of the article as a handling method in which the article is released at a high position from the placement surface. Accordingly, if the price of the article is low, the timing for releasing the article becomes early, and it is possible to quickly shift to the operation of handling the next article. If the article is not easily broken and is high-priced, the decision unit 102 may decide the handling method in which the efficiency of the entire work is more prioritized as a handling method in which the article is released at a high position from the placement surface.

In addition, the handling method in which the breakage prevention of the article is more prioritized is a handling method related to an additional operation of handling the article by the robot arm, for example. For example, the decision unit 102 may decide the handling method related to the additional operation of handling the article by the robot arm as a handling method in which if the price of the article is higher than the reference value, at least one of fixing and packaging of the article is performed as an additional operation. The fixing of the article may be applying an adhesive to the bottom of the article, for example. In this case, the decision unit 102 decides, as a handling method, applying an adhesive to the bottom of the article before placing the article and then placing the article at a position to be fixed. The packaging of the article may be putting the article in a box, a bag, or the like serving as a cushioning material, for example. In this case, the decision unit 102 decides, as the handling method, to put the article into a box, a bag, or the like serving as a cushioning material before placing the article. The additional operation on the high-priced article is not limited to these examples, and any method that can be executed by the robot arm may be adopted. On the contrary, if the price of the article is low, the decision unit 102 may decide not to perform an additional operation. This makes it possible to prevent the breakage of the high-priced article and not to take additional operation time for the low-priced article.

Examples of handling methods in which the breakage prevention of the article is more prioritized and handling methods in which the efficiency of the entire operation is more prioritized according to the price are not limited to the above ones. For example, the handling method in which the breakage prevention of the article is more prioritized may be a method of handling the article by a robot arm that is capable of performing more delicate operations. For example, the handling method in which the breakage prevention of the article is more prioritized may be a handling method in which a force of sucking or gripping the article is increased. Various handling methods in which the breakage prevention of the article is more prioritized and various handling methods in which the efficiency of the entire operation is more prioritized may be combined with each other.

The decision unit 102 may determine the handling method based on other characteristics of the article included in the article information in addition to the price. For example, even though the handling method is a handling method in which the price of the article is low and the efficiency of the entire work is prioritized, if the article is heavy, the decision unit 102 may decide the handling method of the article as a handling method in which the article is handled by two robot arms. For example, even though the handling method is a handling method in which the price of the article is low and the efficiency of the entire work is prioritized, if the article is fragile, the decision unit 102 may decide the ling method of the article as a handling method in which the operation speed of the robot arm is decreased. For example, as described in the example in which the handling method is included in the article information, the decision unit 102 may decide, as the handling method of the article, the handling method in which the damage prevention of the article is more prioritized between the handling method according to the price of the article and the handling method based on another feature of the article. The other feature of the article is not limited to the examples such as the weight of the article and the fragility of the article. For example, the other characteristic of the article may be at least one of the size of the article, the material of the article, whether the article is a dangerous article, and the flammability of the article.

In FIG. 3, the control unit 103 is an example of a control means that controls the robot arm in accordance with the determined handling method. The control unit 103 controls the robot arm to handle the article under the conditions indicated in the handling method described above. A known method may be used to control the robot arm. For example, the control unit 103 uses the work instruction, the sensor data, and the article information to set the suction position or the gripping position of the article, the strength of suction or gripping, the operation speed, the position at which to release the article, and the like, and activates the robot arm.

The operations of the control device 100 configured as described above will be described with reference to the flowchart of FIG. 11.

FIG. 11 is a flowchart illustrating the outline of the operations of the control device 100 according to the present example embodiment in order to control the robot arm to handle one article or a predetermined unit of articles. The processing according to this flowchart may be executed under program control by the processor.

First, the acquisition unit 101 acquires article information of an article to be handled by the robot arm (step S101).

Next, based on the article information, the decision unit 102 decides the handling method of the article as the handling method in which as the price of the article is higher, the damage prevention of the article is more prioritized (step S102).

The control unit 103 then controls the robot arm that handles the article in accordance with the handling method (step S103).

As described above, the control device 100 ends a series of operations.

In the control device according to the present example embodiment described above, the acquisition unit acquires the article information including the price of the article to be handled by the robot arm. Based on the article information, the decision unit decides the method for handling the article by the robot arm as the handling method in which as the price of the article is higher, the damage prevention of the article is more prioritized. Then, the control unit controls the robot arm that handles the article in accordance with the handling method.

As a result, the control device according to the present example embodiment allows various articles to be appropriately handled in the work of handling the articles using the robot arm.

In the work of handling various articles, the prices of the articles may vary. Performing the entire work in a careful manner makes it possible to prevent breakage of high-priced articles, but the efficiency of the entire work becomes lower in that case. In contrast to this, the control device of the present example embodiment sets, in the work of handling articles, the handling method of higher-priced articles of which loss in the case of being damaged is larger than that of lower-priced articles, as the handling method in which the damage prevention of the article is more prioritized. This makes it possible to improve the efficiency of the entire work while preventing breakage of high-priced articles.

[Modification]

Next, a modification of the present disclosure will be described. Hereinafter, description of the matter overlapping with the above description will be omitted to the extent that the description of the present example embodiment is not unclear.

In the modification, a decision unit 102 decides the handling method as the handling method in which the damage prevention of the article is more prioritized in a case where an article with a price higher than the reference value is included in the work range of the robot arm. If an article with a price higher than the reference value is included in the work range of the robot arm, the decision unit 102 decides the handling method as the handling method in which the damage prevention of the article is more prioritized, whereby it is possible to enhance the effect of preventing breakage of the article having a price higher than the reference value. That is, the decision unit 102 decides the handling method of the work target article as the handling method in which if an article with a price higher than the reference value is included in the work range of the robot arm, the damage prevention of the article is more prioritized. Accordingly, even in the event of a problem in the robot arm, it is possible to reduce the possibility of giving a strong impact to the article with a price higher than the reference value included in the work range, for example. The reference value of the price of an article other than the work target article among the articles in the work range in the modification may be different from the reference value of the price of the work target article in the embodiment. For example, the reference value of the price of the article other than the work target article in the work range may be set higher than the reference value of the price of the work target article described in the embodiment. In the following description, the article included in the work range and having a price higher than the reference value will be also called high-priced article in the work range.

Figure 12:
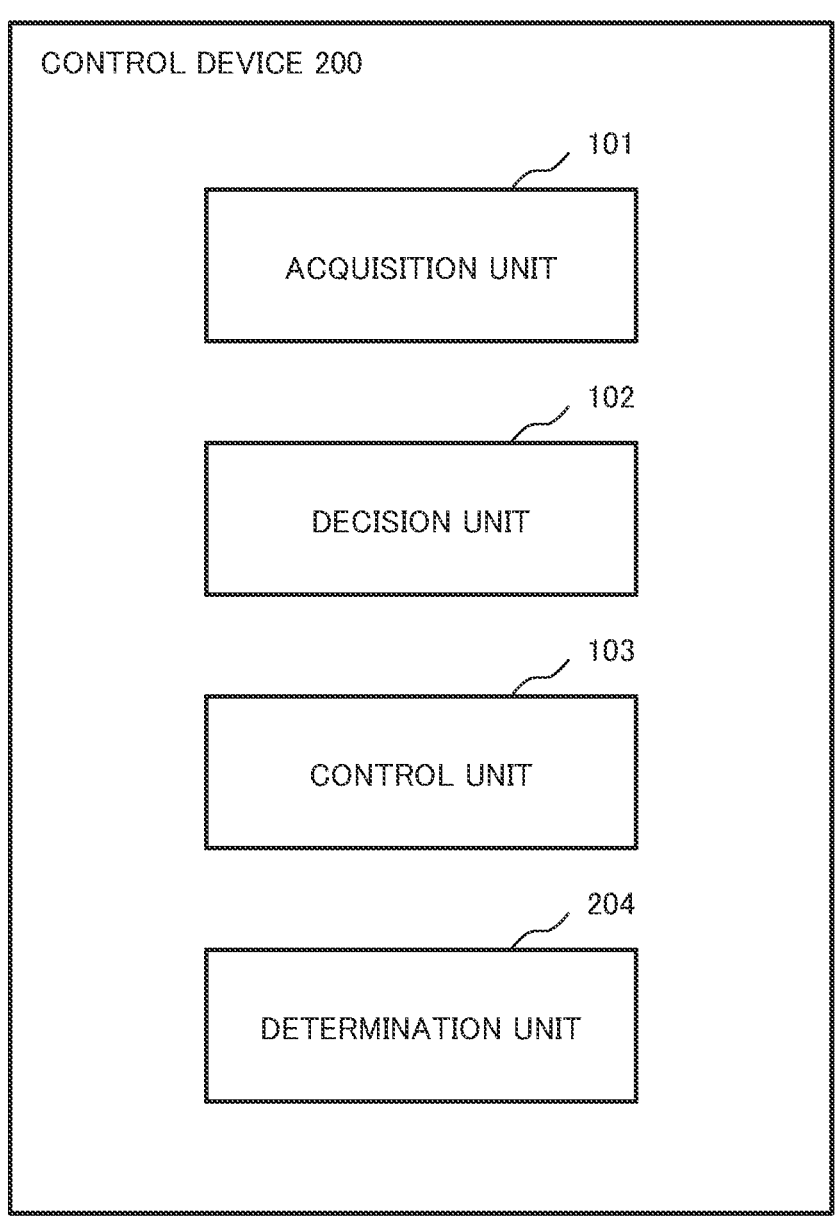
FIG. 12 is a block diagram illustrating a functional configuration of the control device.

FIG. 12 is a block diagram illustrating a functional configuration of a control device 200 according to the modification. In FIG. 12, the control device 200 further includes a determination unit 204 in addition to the configuration of the control device 100 of the embodiment.

The determination unit 204 determines whether an article with a price higher than the reference value is included in the work range of the robot arm. For example, the determination unit 204 specifies articles with prices higher than the reference value at a movement source or a movement destination of the articles in accordance with the work instruction, and compares the price of each specified article included in the article information with a preset reference value, thereby determining whether any article with a price higher than the reference value is included in the work range of the robot arm.

If any article with a price higher than the reference value is included in the work range of the robot arm based on the result of determination by the determination unit 204, the decision unit 102 decides the handling method as a handling method in which the breakage prevention of a high-priced article in the work range is prioritized.

For example, as the handling method in which the breakage prevention of a high-priced article in the work range is prioritized, the decision unit 102 decides that the work target article is not to be placed on the high-priced article in the work range. If the weight of the work target article is larger than a predetermined value, the decision unit 102 may decide the handling method in which the work target article is not placed on the high-priced article in the work range as the handling method in which the breakage prevention of a high-priced article in the work range is prioritized. The predetermined value of the weight of the article may be set to a value at which the high-priced article in the work range is not damaged even if the article is placed on the high-priced article in the work range. As the handling method in which the work target article is not placed on the high-priced article in the work range, there is conceived a handling method in which the high-priced article in the work range is once taken out of a box, then the work target article is placed, and then the high-priced article in the work range is placed on the article again. Alternatively, the handling method in which the work target article is not placed on the high-priced article in the work range may be a handling method in which the work target article is placed in a place other than on the article with a price higher than the reference value in the range of the destination where the work target article is to be placed.

For example, as the handling method in which the breakage prevention of the high-priced article in the work range is prioritized, the decision unit 102 may decide that the article is to be worked at a predetermined distance or more from the high-priced article in the work range. The predetermined distance may be set to a distance at which the high-priced article in the work range is not damaged. For example, the predetermined distance may be determined according to the accuracy of control of the robot arm. For example, the decision unit 102 may decide that the robot arm is to be prevented from entering a range of a predetermined distance from the high-priced article in the work range. For example, the decision unit 102 may decide that the work target article is not to be placed in a range of a predetermined distance from the high-priced article in the work range.

The handling method in which the breakage prevention of the high-priced article in the work range is prioritized is not limited to these examples. For example, the handling method in which the breakage prevention of the article with a price higher than the reference value is prioritized in the embodiment may be applied.

In the modification, the determination unit 204 determines whether the article with a price higher than the reference value is included in the work range. Alternatively, this determination may be performed by the decision unit 102.

Although the present invention has been described with reference to the example embodiments, the present invention is not limited to the above example embodiments.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Various modifications that can be understood by those skilled in the art can be made to the configuration and details of the present disclosure within the scope of the present disclosure.

For example, although the plurality of operations has been described in order in the form of flowchart, the order of description does not limit the order of executing the plurality of operations. Therefore, when each example embodiment is implemented, the order of the plurality of operations may be changed without causing a problem.

Further, it is noted that the inventor's intent is to retain all equivalents of the claimed invention even if the claims are amended during prosecution.

SUPPLEMENTARY NOTE

Some or all of the above example embodiments may be described as the following supplementary notes, but are not limited to the following.
(Supplementary Note 1)
    A control device including
    an acquisition means that acquires article information
        including a price of an article handled by a robot arm,
    a decision means that decides, based on the article infor-
        mation, a handling method of the article to be handled
        by the robot arm, and
    a control means that controls the robot arm that handles
        the article based on the handling method, wherein the
        decision means decides the handling method in which
        as the price of the article is higher, damage prevention
        of the article is more prioritized.
(Supplementary Note 2)
    The control device according to Supplementary Note 1,
wherein
    the decision means decides a handling method related to
        a speed of operation of the robot arm as the handling
        method in which as the price of the article is higher, the
        speed of operation of the robot arm is decreased.
(Supplementary Note 3)
    The control device according to Supplementary Note 1 or
2, wherein
    the decision means decides a handling method related to
        a speed of operation of the robot arm as the handling
        method in which as the price of the article is higher, at
        least one of acceleration and deceleration of operation
        of the robot arm is decreased.
(Supplementary Note 4)
    The control device according to any of Supplementary
Notes 1 to 3, wherein
    the decision means decide, out of the handling method, a
        handling method related to an operation of lifting the
        article by the robot arm as a handling method in which
        a possibility of fall of the article is lowered.
(Supplementary Note 5)
    The control device according to Supplementary Note 4,
wherein
    the decision means decides the handling method related to
        the operation of lifting the article by the robot arm as
        a handling method in which if the price of the article is higher than a reference value, the article is lifted through suction and gripping by the robot arm, and decides the handling method related to the operation of lifting the article by the robot arm as a handling method in which if the price of the article is lower than the reference value, the article is lifted through suction by the robot arm.

(Supplementary Note 6)

The control device according to Supplementary Note 4 or 5, wherein the decision means decides the handling method related to the operation of lifting the article by the robot arm as a handling method in which as the price of the article is higher, the number of the robot arms that perform the operation of lifting the article is increased.

(Supplementary Note 7)

The control device according to any of Supplementary Notes 1 to 6, wherein the decision means decides, out of the handling method, a handling method related to an operation of placing the article by the robot arm as a handling method in which when the article is placed, an impact applied to the article is reduced.

(Supplementary Note 8)

The control device according to Supplementary Note 7, wherein the decision means decides a handling method related to an operation of releasing the article by the robot arm as a handling method in which as the price of the article is higher, a distance from an article placement surface to the article during the operation of releasing the article is shortened.

(Supplementary Note 9)

The control device according to any of Supplementary Notes 1 to 8, wherein the decision means decides, out of the handling method, a handling method related to an additional operation by the robot arm that handles the article.

(Supplementary Note 10)

The control device according to Supplementary Note 9, wherein the decision means decides the handling method related to the additional operation by the robot arm that handles the article as a handling method in which if the price of the article is higher than a reference value, at least one of fixing and packaging of the article is performed as the additional operation.

(Supplementary Note 11)

The control device according to any of Supplementary Notes 1 to 10, further including a determination means that specifies an article included in a work range of the robot arm based on work information or a peripheral image of the robot arm, and determines based on the article information that an article with a price higher than a reference value is included in the work range of the robot arm, wherein if it is determined that an article with a price higher than the reference value is included in the work range of the robot arm, the decision means decides the handling method as a handling method in which the damage prevention of the article with a price higher than the reference value included in the work range is more prioritized.

(Supplementary Note 12)

The control device according to Supplementary Note 11, wherein the decision means decides the handling method as a handling method in which work is performed at a predetermined distance or more from the article with a higher price than the reference value included in the work range.

(Supplementary Note 13)

A control method by a computer, the control method including acquiring article information including a price of an article to be handled by a robot arm, deciding a handling method of the article by the robot arm based on the article information as a handling method in which as the price of the article is higher, breakage prevention of the article is more prioritized, and controlling the robot arm that handles the article based on the handling method.

(Supplementary Note 14)

A non-transitory computer-readable recording medium that records a program for causing a computer to execute acquiring article information including a price of an article to be handled by a robot arm, deciding a handling method of the article by the robot arm based on the article information as a handling method in which as the price of the article is higher, breakage prevention of the article is more prioritized, and controlling the robot arm that handles the article based on the handling method.

The invention claimed is:

1. A control device comprising:

a memory storing instructions; and one or more processors configured to execute the instructions to:

acquire article information including a price of an article handled by a robot arm;

determine a handling method of the article to be handled by the robot arm based on the article information as a handling method in which as the price of the article is higher, breakage prevention of the article is more prioritized;

in case the price of the article is higher than a reference value, decide a handling method related to an additional operation by the robot arm that handles the article; and control the robot arm that handles the article based on the handling method.

2. The control device according to claim 1, wherein the one or more processors are further configured to execute the instructions to:

decide a handling method related to a speed of operation of the robot arm as the handling method in which as the price of the article is higher, the speed of operation of the robot arm is decreased.

3. The control device according to claim 1, wherein the one or more processors are further configured to execute the instructions to:

decide a handling method related to a speed of operation of the robot arm as the handling method in which as the price of the article is higher, at least one of acceleration and deceleration of operation of the robot arm is decreased.

4. The control device according to claim 1, wherein the one or more processors are further configured to execute the instructions to:

decide a handling method related to an operation of lifting the article by the robot arm as a handling method in which as the price of the article is higher, a possibility of fall of the article is lowered.

5. The control device according to claim 4, wherein the one or more processors are further configured to execute the instructions to:

in case the price of the article is higher than a reference value, decide the handling method related to the operation of lifting the article by the robot arm to be a handling method through suction and gripping by the robot arm, and in case the price of the article is lower than the reference value, decide the handling method related to the operation of lifting the article by the robot arm to be a handling method through suction by the robot arm.

6. The control device according to claim 4, wherein the one or more processors are further configured to execute the instructions to:

decide the handling method related to the operation of lifting the article by the robot arm as a handling method in which as the price of the article is higher, the number of the robot arms that perform the operation of lifting the article is increased.

7. The control device according to claim 1, wherein the one or more processors are further configured to execute the instructions to:

decide a handling method related to an operation of placing the article by the robot arm as a handling method in which as the price of the article is higher, an impact applied to the article when the article is placed is reduced.

8. The control device according to claim 7, wherein the one or more processors are further configured to execute the instructions to:

decide a handling method related to an operation of releasing the article by the robot arm as a handling method in which as the price of the article is higher, a distance from an article placement surface to the article during the operation of releasing the article is shortened.

9. The control device according to claim 1, wherein the additional operation is at least one of fixing and packaging of the article.

10. The control device according to claim 1, wherein the one or more processors are further configured to execute the instructions to:

specify an article included in a work range of the robot arm based on work information or a peripheral image of the robot arm;

determine based on the article information that an article with a price higher than a reference value is included in the work range of the robot arm; and in case it is determined that an article with a price higher than the reference value is included in the article included in the work range of the robot arm, decide the handling method as a handling method in which the damage prevention of the article with a price higher than the reference value included in the work range is more prioritized.

11. The control device according to claim 10, wherein the one or more processors are further configured to execute the instructions to:

decide the handling method as a handling method in which work is performed at a predetermined distance or more from the article with a higher price than the reference value included in the work range.

12. A control method by a computer, the control method comprising:

acquiring article information including a price of an article to be handled by a robot arm;

deciding a handling method of the article by the robot arm based on the article information as a handling method in which as the price of the article is higher, breakage prevention of the article is more prioritized;

in case the price of the article is higher than a reference value, deciding a handling method related to an additional operation by the robot arm that handles the article; and controlling the robot arm that handles the article based on the handling method.

13. A non-transitory computer-readable recording medium that records a program for causing a computer to execute:

acquiring article information including a price of an article to be handled by a robot arm;

deciding a handling method of the article by the robot arm based on the article information as a handling method in which as the price of the article is higher, breakage prevention of the article is more prioritized;

in case the price of the article is higher than a reference value, deciding a handling method related to an additional operation by the robot arm that handles the article; and controlling the robot arm that handles the article based on the handling method.

\*    \*    \*    \*    \*